United States Patent Office 2,846,171
Patented Aug. 5, 1958

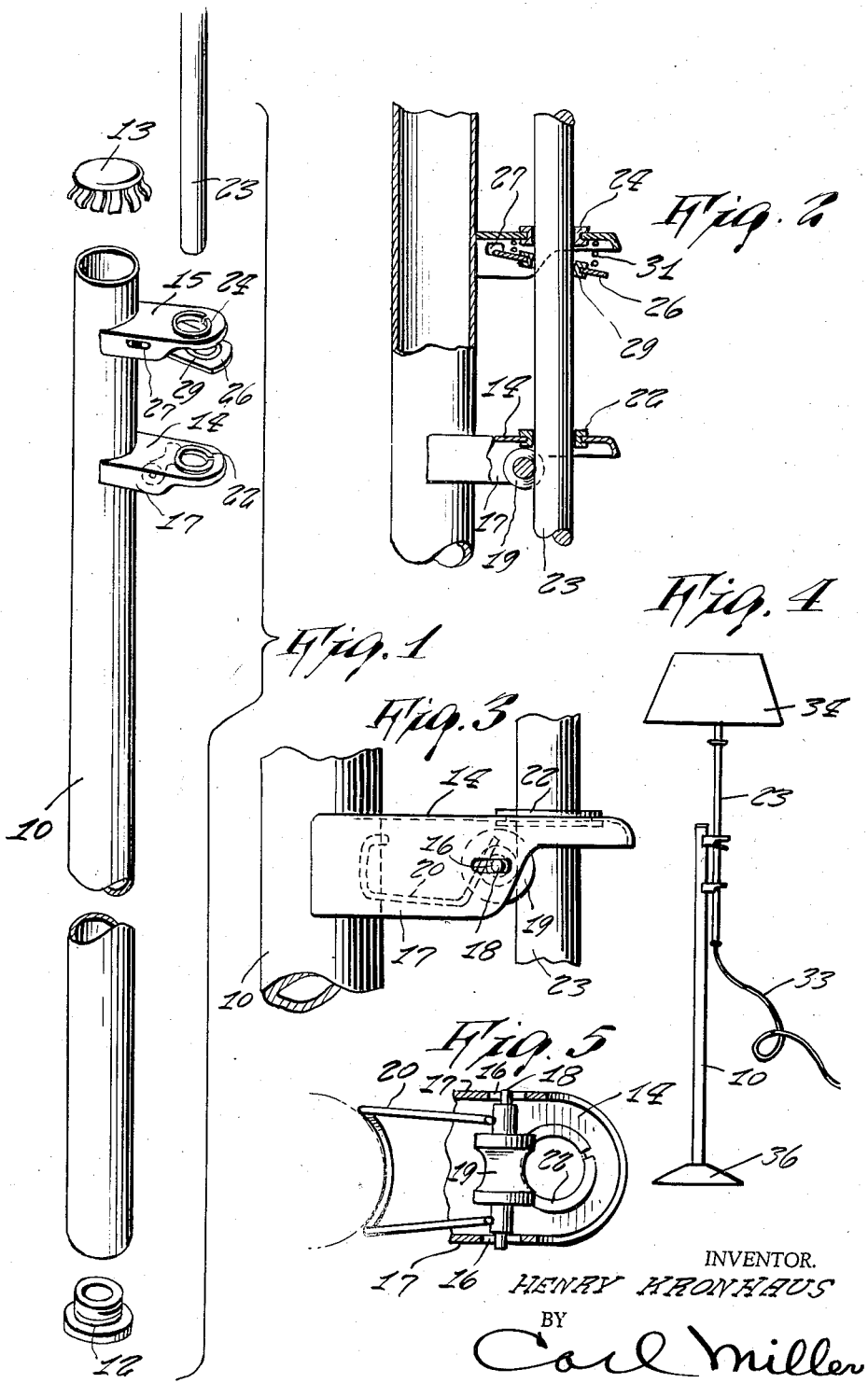

2,846,171

TELESCOPING SUPPORT UNIT

Henry Kronhaus, Brooklyn, N. Y.

Application January 15, 1957, Serial No. 634,311

2 Claims. (Cl. 248—161)

This invention relates to support structure for lamps and, more particularly, to a telescopic support unit of adjustable height.

As the need for lighting conditions vary with the particular need, it has been found desirable to provide a height adjustment for reading lamps to suit any individual requirements. An object of this invention therefore is to provide a manually operated adjustment mechanism for floor and table lamps that is simple in construction, efficient in operation, and which may be selectively adjusted to any desired height.

Another object of this invention is to provide a lock and brake mechanism for controlling the longitudinal movement of an upper member relative to a fixed base member that may be adapted for use with various types of telescoping equipment and which may be manufactured in quantity at substantially low cost.

All of the foregoing and still further objects and advantages of this invention will become apparent from a study of the following specification, taken in connection with the accompanying drawing, wherein:

Figure 1 is an exploded perspective view of a device embodying the present invention;

Figure 2 is a side view of the assembled structure shown in Figure 1, with parts broken away;

Figure 3 is an enlarged fragmentary side view of certain parts of the structure shown in Figure 2;

Figure 4 is a side elevational view showing a floor lamp embodying the present invention; and Figure 5 is a partial bottom view of the mechanism shown in Figure 3.

Referring now to Figures 1 and 2 of the drawing, a telescopic support unit for lamps made in accordance with the present invention is shown to include a lower, relatively fixed, base member 10 that is preferably of tubular construction. The lower end of this member is provided with a mounting bushing 12 for securing the member to the base of a floor lamp. The upper end of the member 10 is closed by means of a decorative cap 13 and is provided with a pair of aligned, vertically spaced brackets 14, 15.

As is more clearly shown in Figures 3 and 5, the lower bracket 14 has a pair of side walls 17, each of which is provided with a horizontally extending slot 16 for rotatably and horizontally displaceably supporting the axle 18 of a roller unit 19. A spring 20 is disposed between the member 10 and the hub of the roller wheel 19 and normally urges the roller in a direction away from the base member. The upper surface of the lower bracket is provided with a central opening in which a nylon type bushing 22 is secured. An upper support member 23 is slideably received within the bushing 22 and within an upper bushing 24 similarly mounted within a central opening in the top surface of the upper bracket 15.

The upper bracket 15 includes a locking device in which a lever 26 is pivotally supported at one end within enlarged openings 27 in the side walls of the bracket. This lever also has a centrally disposed opening in which a similar bushing 29 is supported in substantial alignment with the lower and upper bushings 22, 24, respectively. A compression spring 31 is seated at one end against the lower surface of the upper bracket 15 and at the opposite end upon the upper surface of the lever 26 so as to urge the lever 26 towards a normally lowered position.

As is more clearly shown in Figure 4, the lower member 10 may be secured to a base 36 while the upper tubular member 23 may house an electric supply line 33 that extends therethrough to supply current to a lamp and shade assembly 34 that may be supported at the upper end thereof. With the parts in the assembled position, as shown in Figure 2, downward movement of the upper member 23 is prevented by the binding action of the lever bushing 29 against the sides of the upper member. However, by exerting an upward pressure against the outer end of the lever 26, it may be moved against the action of the spring 31 so that all of the bushings are in substantial vertical alignment, thereby releasing the locking engagement of the lever with the member. Rapid movement of the upper member in a downward direction is prevented by the action of the roller assembly 19 which frictionally resist such movement in view of the bearing engagement of the adjacent portions of the spring 20 on the hub of the roller, and which also guides the upper support member for movement substantially perpendicular to the plane of the upper bracket 14 to assure proper operation of the device.

While this invention has been described with particular reference to the specific form shown in the drawing, it is to be understood that such is not to be construed as imparting limitations upon the invention, which is best defined by the claims appended hereto.

Having thus described my invention, I claim as new and desire to secure by Letters Patent:

1. A telescoping support unit for lamps, comprising in combination, a lower base member having support means at one end and a pair of longitudinally spaced apart brackets at the opposite end, an upper member slidably received within aligned openings in said brackets for longitudinal movement, and lock means carried by one said bracket for locking said upper member in an adjusted longitudinal position relative to said lower member, said one bracket having a pair of spaced parallel and downwardly extending side flanges, each of said side flanges defining an opening, and said lock means comprising a lever having portions at one end pivotally supported within said openings in said side flanges, said lever having a central opening adapted to register with said bracket openings to permit relative sliding movement of said upper member, and spring means normally urging said lever out of said alignment to engage in binding relationship with said upper member, said lower bracket comprising brake means in rolling engagement with said upper member for retarding downward movement of said upper member relative to said lower member in response to the release of said lock means.

2. A support unit as set forth in claim 1, wherein said brake means comprises a roller in engagement with said upper member and friction means normally resisting rotation of said roller.

References Cited in the file of this patent

UNITED STATES PATENTS

| 179,301 | Gurley | June 27, 1876 |
| 1,999,844 | McElroy | Apr. 30, 1935 |
| 2,051,969 | Shastock | Aug. 25, 1936 |
| 2,311,986 | Henschel | Feb. 23, 1943 |
| 2,381,340 | Eastman | Aug. 7, 1945 |